United States Patent Office.

EDGAR M. STEVENS, OF CHELSEA, MASSACHUSETTS, ASSIGNOR TO HIMSELF AND W. N. ELY, [TRUSTEE,] OF STRATFORD, CONNECTICUT. *Trustees*

Letters Patent No. 75,807, dated March 24, 1868.

---

IMPROVEMENT IN THE MANUFACTURE OF ENAMELLED CLOTH.

---

The Schedule referred to in these Letters Patent and making part of the same.

---

Be it known that I, EDGAR M. STEVENS, of Chelsea, Massachusetts, have invented a new and improved Enamelled Cloth, of which the following is a description.

Rubber cloth is an article well known in commerce, and rubber cloth, so called, is sometimes varnished and enamelled, but rubber and enamelled rubber cloth is vulcanized for use, and the rubber is mixed with the ordinary vulcanizing materials for that purpose. The ordinary American enamelled cloth, however, such as is known and used in commerce as such, is prepared without the use of any rubber among the ingredients, and, although heat may be used to some extent in some part of its preparation, it is not vulcanized. This kind of enamelled cloth is very extensively used in covering furniture and cushions, for carriage-curtains, and other similar purposes.

Rubber has been used, with other ingredients, for the purpose of water-proofing cloth, and making it a substitute for leather, but these processes have been expensive, and have differed materially from the common processes for making what is known as enamelled cloth.

The ordinary enamelled cloth, as made, is liable to crack when exposed to cold, and is not reliable for wear as water-proof.

The nature of my invention consists in adding a percentage of plastic rubber, or rubber prepared with any suitable solvent, as the ordinary rubber cement, to the ordinary ingredients used in preparing the so-called ordinary enamelled cloth, and enamelling the same with the ordinary processes. The percentage of rubber should not usually be less than one-sixteenth, and not more, usually, than one-quarter, according to the purposes for which the cloth is to be used. This gives to the material additional tenacity and toughness, with additional pliability in all variations of temperature and under all ordinary wear. With this addition, a compound rubber-enamel cloth is produced with the advantages above named.

The usual ingredients used in preparing the ordinary cloth are litharge and boiled oil, the litharge being used in pretty large quantities, to give weight and body to the coating, but, in the preparation of this cloth, I cannot learn that rubber has ever before been used. Processes have been devised for making a kind of water-proof or leather cloth, in which less than two per cent. of rubber was used, but the main ingredient was rosin or pitch, with a mixture of sulphur and lamp-black. This, however, without the rubber, makes a coating differing materially from that upon the ordinary enamelled cloth, and, with the rubber, makes a coating entirely different from mine.

A better preparation, however, as I consider, and one more particularly used by me, is a mixture of boiled linseed oil, litharge, burnt umber, and plastic or dissolved rubber, each one part; but while I use these ingredients, I do not wish to confine myself to these precise proportions. They may be varied according to the thickness and quality of the stock and the material required. The coloring, final varnishing, and finishing may be such as may be desired for use.

What I claim, therefore, is the compound rubber-enamel cloth, substantially as described.

Witness my hand to the foregoing specifications.

E. M. STEVENS.

Witnesses:
  W. M. PARKER,
  J. CLAXTON WIGHTMAN.